United States Patent Office 3,484,380
Patented Dec. 16, 1969

3,484,380
FLUORESCENT EUROPIUM CHELATES WITH TETRADENTATE LIGANDS
Marcos Kleinerman, Southbridge, Mass., assignor, by mesne assignments, to American Optical Corporation, Southbridge, Mass., a corporation of Delaware
No Drawing. Filed Dec. 15, 1965, Ser. No. 514,436
Int. Cl. C09k 1/02
U.S. Cl. 252—301.2    13 Claims

---

ABSTRACT OF THE DISCLOSURE

A fluorescent europium chelate with tetradentate ligands is provided by the condensation of salicylaldehyde and salicylaldehyde derivatives with an aliphatic or aromatic 1,2-diamine. The resulting chelate has very narrow emission bands in which most of the fluorescence occurs.

---

The field of this invention is that of fluorescent materials and the invention relates more particularly to novel and improved europium chelates characterized by improved fluorescence and stability.

It is known that certain europium chelates are capable of light emission such as fluorescence when irradiated with light of selected wavelengths. As a result of this property, such chelate materials are useful in surface coatings and the like and are of considerable interest in laser developments and applications. Such chelate materials are also useful in color-translating fluorescent screens of various types.

It is an object of this invention to provide novel and improved fluorescent europium chelates; to provide such europium chelates having tetradentate ligands; to provide such materials which are characterized by a very narrow emission band in which fluorescence occurs; to provide such fluorescent compositions which are of high fluorescence efficiency; to provide fluorescent europium chelates of improved stability; to provide such fluorescent materials which can be established in various plastic carriers without loss of their desirable fluorescence properties; and to provide novel and improved crystalline fluorescent materials.

How these and other objects of this invention are accomplished is fully disclosed in the following detailed description of preferred embodiments of the invention;

Europium chelates prepared in accordance with this invention embody a tetradentate liquid derived from salicylaldehydes and diamines. Two molecules of a selected salicylaldehyde compound and one molecule of the selected diamine are combined in a condensation process to form the tetradentate ligand. The ligand is then bound to an europium ion by two bonds formed between the europium ion and two oxygen atoms of the ligand and by two bonds formed between the ion and two nitrogen atoms of the ligand.

For example, in a preferred embodiment of this invention, two molecules of 3,5-dichlorosalicylaldehyde are combined with one molecule of ethylene diamine in a condensation process to provide a ligand-forming compound having the formula:

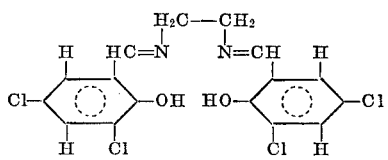
(1)

This ligand-forming compound is then combined with an europium ion to form a crystalline fluorescent europium chelate having the formula:

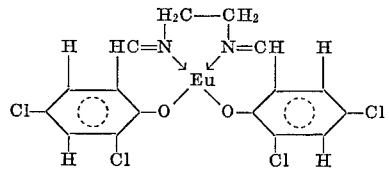
(2)

This europium chelate displays a good fluorescence properties and is adapted to fluoresce in the visible spectrum with a red orange color when irradiated with ultraviolet light even at room temperature. The crystalline chelate provides a fluorescence yield of about 50 percent at 300° K. and has a fluorescent lifetime of 0.46 milliseconds at 300° K. and of 0.81 milliseconds at 77° K. The chelate material is marked by good stability and is characterized by a vary narrow emission band, substantially all of the fluorescent emission of the material occurring in a bandwidth of about 9 angstroms at 300° K. and of about 5 angstroms at 77° K.

In another preferred embodiment of this invention, two molecules of 5-nitrosalicylaldehyde are combined with one molecule of ethylene diamine in a condensation process to provide a ligand-forming compound. This compound is then combined with europium ion to form a crystalline fluorescent europium chelate having the formula:

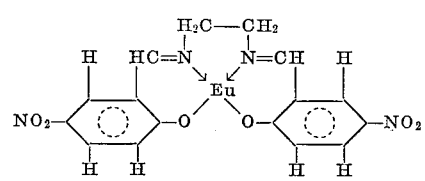
(3)

This europium chelate is also adapted to fluoresce in the visible spectrum with a red orange color when irradiated with ultraviolet light at room temperature. The chelate when dissolved in an acrylic plastic like methyl methacrylate has a fluorescence yield of greater than 50 percent at 300° K. and has a fluorescent lifetime of 0.52 milliseconds at 300° K. and of 0.65 milliseconds at 77° K. The system is also stable and has a fluorescent emission bandwidth of about 15 angstroms at 300° K. and of about 7 angstroms at 77° K.

In addition to 3,5-dichlorosalicylaldehyde and 5-nitrosalicylaldehyde, other salicylaldehyde compounds such as salicylaldehyde, 5-chlorosalicylaldehyde and 5-methoxysalicylaldehyde can also be employed as constituents of the tetradentate ligands provided by this invention. Any of these salicylaldehyde compounds can be combined in condensation processes with various aliphatic and aromatic diamines such as 1,3-propane diamine, 1,2-propane diamine and o-phenylene diamine to form such tetradentate ligands.

For example, in a practical embodiment of this invention salicylaldehyde is combined in a condensation process with ethylene diamine and the resulting Schiff base is bound to an europium ion to form a fluorescent europium chelate having the formula:

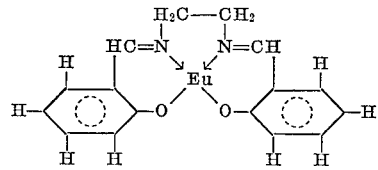
(4)

The fluorescence efficiency of this europium chelate is enhanced by the presence of a Lewis base such as biguanide, phenylbiguanide, hexamethyl phosphoric triamide, dimethyl formamide, or 1,1,3,3-tetramethylguanidine.

Other Lewis bases can also be employed to enhance the fluorescence efficiency of the europium chelates of this invention. These Lewis bases are particularly useful with chelates having tetradentate ligands derived from a salicylaldehyde compound selected from the group consisting of salicylaldehyde, 5-chlorosalicylaldehyde and 5-methoxysalicylaldehyde and from a diamine selected from the group consisting of 1,3-propane diamine, 1,2-propane diamine and o-phenylene diamine. For example such Lewis bases include dimethylsulfoxide, tri-n-butylphosphate, pyridine, piperidine, triethylamine, tetramethylammonium hydroxide, triethylenediamine, diethylenetriamine, triethylene tetramine, meta-xylylene diamine, tri-n-octylphosphine oxide, tri-n-butylphosphine oxide, morpholine, and 2,4-dimethylmorpholine.

The ligand employed in accordance with this invention is formed in conventional manner by mixing a solution of the selected salicylaldehyde compound, in a solvent such as ethanol, with a corresponding amount of the selected diamine. These materials combine in a condensation process to form the Schiff base, ligand-forming compound which precipitates from the solution. This precipitate can be separated from the solution by filtering and can be washed and dried. One means for preparing the europium chelates of this invention is to heat a mixture of the above-described ligand-forming compound with the rare earth salt, preferably an acetate salt such as europium acetate, in an appropriate solvent such as dimethyl sulfoxide or hexamethyl phosphoric triamide until the solids dissolve. Upon cooling, the chelate precipitates, is filtered from the solution, and is washed with ethanol. This precipitate comprises the crystalline fluorescent chelate provided by this invention.

For example, in forming a preferred chelate previously described, 3,5-dichlorosalicylaldehyde and ethylene diamine are combined in an ethanol solvent to form the Schiff base, ligand-forming precipitate noted above. When the ligand-forming precipitate has been separated from the solvent, it is dissolved in the mutual solvent hexamethyl phosphoric triamide with europium acetate. This solution is heated until all solids have dissolved and is then cooled to form the desired europium chelate precipitate which can be separated by filtering as noted above. The resulting crystalline fluorescent chelate is that noted above with reference to Formula 2. It will be understood that many other solvents including Lewis bases previously noted and other organic solvents can also be used. It will also be understood that other methods for preparing the chelates of this invention will be recognized by persons skilled in the art.

The fluorescent europium chelates of this invention, particularly the crystalline chelate materials having tetradentate liquids derived from 3,5-dichlorosalicylaldehyde or 5-nitrosalicylaldehyde and ethylene diamine have been embodied in various plastic materials such as acrylic polymers, styrene polymers, acrylic-styrene copolymers and amine-cured epoxy resins without significant reduction in the fluorescence properties of the chelate materials. This has been accomplished by dissolving the crystalline chelates in a monomer of the selected plastic in presence of a Lewis base, and by thereafter polymerizing the plastic material in conventional manner, preferably by employing azo-initiators as polymerization catalysts.

I claim:

1. A fluorescent composition consisting essentially of an europium chelate having a tetradentate ligand wherein said ligand is derived from the reaction product of at least one diamine and at least one salicylaldehyde compound selected from the group consisting of salicylaldehyde, 3,5-dichlorosalicylaldehyde, 5 - chlorosalicylaldehyde, 5-nitrosalicylaldehyde, and 5-methoxysalicylaldehyde.

2. A fluorescent composition as set forth in claim 1 wherein said diamine is selected from the group consisting of ethylene diamine, 1,3-propane diamine, 1,2-propane diamine, and o-phenylene diamine.

3. A fluorescent composition as set forth in claim 2 in a solvent.

4. A fluorescent composition as set forth in claim 2 in the presence of a Lewis base.

5. A fluorescent composition as set forth in claim 2 in a light-transmitting carrier.

6. A crystalline fluorescent europium chelate having the formula:

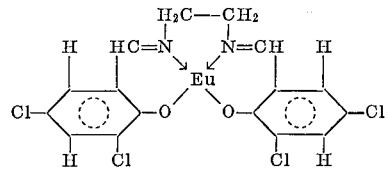

7. A crystalline fluorescent europium chelate having the formula:

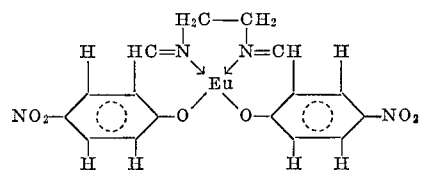

8. A fluorescent europium chelate having the formula:

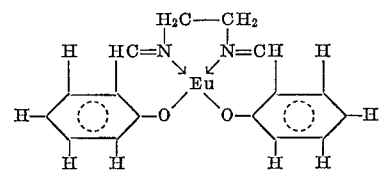

9. A method for preparing a fluorescent material which comprises the steps of combining a salicylaldehyde selected from the group consisting of salicylaldehyde, 3,5-dichlorosalicylaldehyde, 5-chlorosalicylaldehyde, 5-nitrosalicylaldehyde and 5-methoxysalicylaldehyde with a diamine selected from the group consisting of ethylene diamine, 1,3-propane diamine, 1,2-propane diamine, o-phenylene diamine and an organic europium salt in a mutual solvent, and heating the resulting solution to form a fluorescent europium chelate having a tetradentate ligand.

10. A method for preparing a crystalline fluorescent material which comprises the steps of combining a salicylaldehyde selected from the group consisting of 3,5-dichlorosalicylaldehyde and 5-nitrosalicylaldehyde, ethylene diamine and europium acetate in a mutual solvent, heating the resultant solution, and thereafter cooling said solution to precipitate a crystalline europium chelate having a tetradentate ligand.

11. A method for generating fluorescence which comprises the steps of providing an europium chelate having a tetradentate ligand derived from the condensation product of salicylaldehydes selected from the group consisting of salicylaldehyde, 3,5-dichlorosalicylaldehyde, 5-chlorosalicylaldehyde, 5-nitrosalicylaldehyde, and 5-methoxysalicylaldehyde and diamines selected from the group consisting of ethylene diamine, 1,3-propane diamine, 1,2-propane diamine, and o-phenylene diamine, and subjecting said chelate to ultraviolet radiation.

12. A method for generating fluorescence as set forth in claim 11 wherein said chelate is established in solution with a Lewis base before said chelate is subjected to said ultraviolet radiation.

13. A method for generating fluorescence as set forth in claim 11 wherein said chelate is established in a light-transmitting carrier before said chelate is subjected to said ultraviolet radiation.

References Cited

UNITED STATES PATENTS

| 3,360,478 | 12/1967 | Schimitschek et al. | 252—301.2 |
| 3,377,292 | 4/1968 | Halverson | 252—301.3 |
| 3,027,391 | 5/1962 | Frigerio | 260—429.2 |

FOREIGN PATENTS 1,345,477  10/1963  France.

TOBIAS E. LEVOW, Primary Examiner
ROBERT D. EDMONDS, Assistant Examiner

U.S. Cl. X.R.

260—429.2